United States Patent
Mitin

(10) Patent No.: US 12,526,257 B2
(45) Date of Patent: Jan. 13, 2026

(54) METHOD AND A SYSTEM OF TUNNELING TRAFFIC IN A DISTRIBUTED NETWORK FOR DETECTING MALWARE

(71) Applicant: F.A.C.C.T. NETWORK SECURITY LLC, Moscow (RU)

(72) Inventor: Arseniy Mitin, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 359 days.

(21) Appl. No.: 18/106,597

(22) Filed: Feb. 7, 2023

(65) Prior Publication Data

US 2023/0388275 A1    Nov. 30, 2023

(30) Foreign Application Priority Data

May 27, 2022    (RU) ................................ 2022114307

(51) Int. Cl.
  *H04L 9/40*    (2022.01)
(52) U.S. Cl.
  CPC ........ *H04L 63/029* (2013.01); *H04L 63/0236* (2013.01); *H04L 63/1416* (2013.01); *H04L 2212/00* (2013.01)
(58) Field of Classification Search
  CPC .............. H04L 63/029; H04L 63/0236; H04L 63/1416; H04L 2212/00; H04L 12/4633; G06F 21/53; G06F 21/566
  See application file for complete search history.

(56) References Cited

U.S. PATENT DOCUMENTS

| | | | |
|---|---|---|---|
| 7,680,943 B2 | 3/2010 | Conta et al. | |
| 7,840,701 B2 | 11/2010 | Hsu et al. | |
| 10,404,661 B2 | 9/2019 | Ettema et al. | |
| 10,791,132 B1 | 9/2020 | Power et al. | |

(Continued)

FOREIGN PATENT DOCUMENTS

| | | |
|---|---|---|
| RU | 2595968 C2 | 8/2016 |
| RU | 2797264 C1 | 6/2023 |
| WO | 2016/081561 A1 | 5/2016 |

OTHER PUBLICATIONS

Search Report with regard to the counterpart RU Patent Application No. 2022114307 completed Jan. 27, 2023.
Search Report with regard to the counterpart RU Patent Application No. 2023110050 dated Jan. 17, 2024.
Wikipedia, "Network address translation", https://ru.wikipedia.org/wiki/NAT accessed on Feb. 15, 2024, 14 pages.

(Continued)

*Primary Examiner* — Thomas A Gyorfi
(74) *Attorney, Agent, or Firm* — BCF LLP

(57) ABSTRACT

A method and system for tunneling traffic in a distributed network are provided. The method comprises: adding, by a central server, at least one emitter and at least one gateway to a neighbor table hosted on the at least one central server; transmitting an IP address of a given emitter to a respective gateway; transmitting an IP address of the respective gateway to the given emitter; in response to receiving a given packet of outgoing traffic from the given emitter, decapsulating the given packet; identifying at the WireGuard level of the given packet, the IP address of the respective gateway associated with the given emitter; encapsulating the given packet at the WireGuard level and the GRE level; and forwarding the given packet of outgoing traffic to the respective gateway for natting for transmitting the given packet to an external server on behalf of the respective gateway.

22 Claims, 6 Drawing Sheets

(56) References Cited

U.S. PATENT DOCUMENTS

| | | | |
|---|---|---|---|
| 2005/0086367 A1 | 4/2005 | Conta et al. | |
| 2014/0317276 A1 | 10/2014 | Tie et al. | |
| 2015/0098465 A1 | 4/2015 | Caputo, II et al. | |
| 2015/0319136 A1 | 11/2015 | Xie et al. | |
| 2016/0357957 A1 | 12/2016 | Deen et al. | |
| 2018/0332005 A1 | 11/2018 | Ettema et al. | |
| 2019/0245887 A1 | 8/2019 | Vierra | |
| 2020/0252429 A1 | 8/2020 | Vissamsetty | |
| 2020/0389469 A1 | 12/2020 | Litichever et al. | |
| 2022/0045905 A1* | 2/2022 | Hankins | H04L 41/0813 |
| 2022/0166755 A1 | 5/2022 | Moore et al. | |
| 2023/0097734 A1* | 3/2023 | Parla | H04L 63/0236 713/151 |
| 2023/0164113 A1* | 5/2023 | Gupta | H04L 61/5061 709/245 |
| 2023/0308458 A1* | 9/2023 | Varsanyi | H04L 63/166 |

OTHER PUBLICATIONS

"Sandbox (computer security)", Wikipedia, retrieved on en.wikipedia.org/wiki/Sandbox_(security) on Feb. 6, 2023, pdf 3 pages.

"Virtual private network", Wikipedia, retrieved on en.wikipedia.org/wiki/VPN on Feb. 6, 2023, pdf 12 pages.

"Tunneling protocol", Wikipedia, retrieved on https://en.wikipedia.org/wiki/Tunneling_protocol on Feb. 6, 2023, pdf 5 pages.

"Next Hop Resolution Protocol", Wikipedia, retrieved on en.wikipedia.org/wiki/Next_Hop_Resolution_Protocol on Feb. 6, 2023, pdf 2 pages.

Search Report with regard to the counterpart RU Patent Application No. 2023117569 dated Apr. 16, 2024.

Search Report with regard to the counterpart NL Patent Application No. 2034309 completed May 17, 2024.

Notification of Granting with regard to the SG Patent Application No. 10202300726U issued Sep. 1, 2025.

* cited by examiner

METHOD AND A SYSTEM OF TUNNELING TRAFFIC IN A DISTRIBUTED NETWORK FOR DETECTING MALWARE

CROSS-REFERENCE

The present application claims priority to a Russian patent application No.: 2022114307, filed on May 27, 2022, and entitled "THE METHOD AND SYSTEM OF TUNNELING TRAFFIC IN DISTRIBUTED NETWORK FOR DETONATING MALWARE", the content of which is incorporated herein by reference in its entirety.

FIELD

The present technology relates broadly to the field of cybersecurity, and more specifically, to a method of and system for tunneling traffic in a distributed network for detecting malware.

BACKGROUND

Cybersecurity experts predict that the number and technical complexity of cybercrime will continue to increase. Cyber criminals are apt to quickly adapt malware to increase its effectiveness and overcome certain methods of malware counteraction. In response to the technical development of the malware, technical means for detecting it hence preventing malware attacks also continue to improve.

Sandboxes (also known as "isolated environments") for analyzing software to detect the malware have been known for a long time in the field of cybersecurity. Sandboxes are described in more detail in the article under the following link en.wikipedia.org/wiki/Sandbox_(security). In response to development of sandboxes, attackers implemented more complex types of malware. Such malware, for example, can analyze and determine the environment it has been downloaded into. As a result, the behavior of malware downloaded into sandbox may differ from behavior of malware downloaded into non-isolated, user, environment.

For example, some malware can bypass static software analysis, which is conducted, by the user or isolated environment, by analyzing different sources of an executable file without executing and studying each source separately. Some malware can stay unnoticed even after the dynamic analysis. The dynamic analysis is conducted by monitoring the malware behavior executed in the sandbox. Some malware could bypass sandboxes unnoticed because they don't contain a malicious code. Instead, they download it from a remote server, but only if the malware is downloaded into client's network, actual user environment. Thus, fraudsters may prepare a target attack on a specific organization by configuring the remote server in such a way that the remote server would send the malicious file only if a request is received from one of corporate subnets belonging to the target organization of the attackers. If the remote server receives the request from any other IP not belonging to a corporate subnet, the remote server would mimic to ordinary web-server and send a non-malicious response.

A technique of replacing the IP address with the desired one, such as a Network Address Translation (NAT) technique (also known as "masquerading" or simply "natting", for short) may seem to be an obvious solution for such a situation. Natting is a method of broadcasting a network address, where a sender's IP address is specified dynamically depending on what IP address has been assigned to interface IP address. More details one the netting are available, for example, under this link en.wikipedia.org/wiki/NAT.

Unfortunately, the simplest implementation of the NAT technique, where the IP address of a sandbox that is not located on the corporate subnet, is replaced with an IP address of the corporate subnet, may not be effective. More specifically, the attacker's remote server, upon receiving a request from the corporate subnet, sends a response to the IP address of the corporate subnet. The corporate subnet most likely would ignore the incoming packet received as a response from the attacker's server, since it did not send the request to the remote attacker's server.

One example of the solution may be organizing a virtual private network (VPN).

The VPN, as described, for example, in this article en.wikipedia.org/wiki/VPN, is a generic name for technologies that allow one or more network connections to be provided over another network, such as the Internet. Each of the network participants, so called peers, has its own local IP address. The routing of each peer is configured by forwarding packets to the Internet through the server. So, for each outgoing packet passing through the server, natting is performed. And for each incoming packet, denatting is performed—the public IP address is replaced with the local IP address of the peer. If the sandbox is one of the peers and is in the corporate VPN network, the natting technology works and solves the problem of IP address replacing. However, this solution may not be effective as one of its disadvantages is a client-server architecture, which requires constantly keeping a large number of connections up to date, which is, in turn, resource-intensive.

Various approaches of traffic tunneling are also known from the prior art. Traffic tunneling is a process that creates a logical connection between two endpoints through encapsulation. More specifically, one network protocol is encapsulated in another, that is, the data transmitted through the tunnel is "packed" together with service fields into the payload area of the carrier protocol. Tunneling is described in more detail here https://en.wikipedia.org/wiki/Tunneling_protocol.

Further, various traffic routing protocols are known in the prior art, including the Next Hop Resolution Protocol (NHRP, en.wikipedia.org/wiki/Next_Hop_Resolution_Protocol). The NHRP is an extension of ATM's Address Resolution Protocol (ARP) routing mechanism, which sometimes is used to improve the efficiency of routing computer network traffic over non-broadcast, multi-access networks. This protocol is defined in IETF RFC 2332 and further described in RFC 2333. It can be used by the sender to determine the route to a destination with minimum jumps. The NHRP differs from protocols similar to the ARP in that the former allows optimizing routing between multiple IP subnets.

Since in the distributed network using the NHRP routing protocol is no central server that would store information about the IP addresses of the subnets, traffic routing requires the presence of public IP addresses for each of the subnets.

At the same time, U.S. Pat. No. 7,680,943-B2, issued on Mar. 16, 2010, assigned to Transwitch Licensing LLC, and entitled "METHODS AND APPARATUS FOR IMPLEMENTING MULTIPLE TYPES OF NETWORK TUNNELING IN A UNIFORM MANNER", discloses a uniform method for implementing multiple tunneling protocols in a switch or router. The method is based on the realization that although the tunneling protocols are very different, they do share a similar overall structure which can be exploited to create a unified method of dealing with multiple protocols.

By using similar data structures to implement multiple protocols, the invention makes data management and programming simple and, therefore, cost effective. According to the invention, all tunneling protocols are abstracted as the mapping of input L2 or L3 streams with output L2 or L3 streams. Mapping is provided by a finite set of tunnel interfaces. The tunnel interfaces map the input streams to output interfaces. As traffic streams flow through these interfaces, they are processed according to defined attributes of these interfaces.

Also, U.S. Pat. No. 10,404,661-B2, issued on Sep. 3, 2019, assigned to Palo Alto Networks Inc, and entitled "INTEGRATING A HONEY NETWORK WITH A TARGET NETWORK TO COUNTER IP AND PEER-CHECKING EVASION TECHNIQUES", discloses techniques for integrating a honey network with a target network environment (e.g., an enterprise network) to counter IP and peer-checking evasion techniques. In some embodiments, a system for integrating a honey network with a target network environment includes a device profile data store that includes a plurality of attributes of each of a plurality of devices in the target network environment; a virtual clone manager executed on a processor that instantiates a virtual clone of one or more devices in the target network environment based on one or more attributes for a target device in the device profile data store; and a honey network policy that is configured to route an external network communication from the virtual clone for the target device in the honey network to an external device through the target network environment.

SUMMARY

It is an object of the present technology to ameliorate at least some of the inconveniences associated with the prior art.

At least some non-limiting embodiments of the present technology are directed to systems and methods of tunnelling the traffic in a distributed network that is configured to store information about the IP addresses of the subnets on a central server, which allows the members of the subnets not to have public IP addresses and be behind the natting procedure described above. Thus, such an architecture of the distributed network may allow effectively encapsulating and decapsulating packets of incoming and outgoing traffic, organizing communication between the sandbox of the distributed network and an external server without disclosing thereto the IP address of the sandbox.

More specifically, in accordance with a first broad aspect of the resent technology, there is provided a method of tunneling traffic in a distributed network for detecting malicious content. The distributed network is implemented using two-layer tunneling, including a WireGuard level and a GRE level. The method is executable by at least one central server of the distributed network. The method comprises: adding, by the at least one central server, at least one emitter and at least one gateway to a neighbor table hosted on the at least one central server: he at least one emitter being a peer of the distributed network configured for analyzing malicious content and receiving data packets encapsulated at the WireGuard level and at the GRE level; and the at least one gateway being a peer of the distributed network configured for natting at least one outgoing traffic packet and denatting at least one incoming traffic packet; transmitting, by the at least one central server, an IP address of a given emitter of the at least one emitter to a respective gateway of the at least one gateway, the given emitter corresponding to the respective gateway in the neighbor table; transmitting, by the at least one central server, an IP address of the respective gateway to the given emitter, the respective gateway corresponding to the given emitter in the neighbor table; in response to receiving at least one packet of outgoing traffic from the given emitter, decapsulating, by the at least one central server, the at least one packet of outgoing traffic; identifying, by the at least one central server, at the WireGuard level of the at least one packet of outgoing traffic, the IP address of the respective gateway associated with the given emitter; encapsulating, by the at least one central server, the at least one packet of outgoing traffic at the WireGuard level and the GRE level, at least one IP address specified at the WireGuard level being different from at least one IP address specified at the GRE level; and forwarding, by the at least one central server, the at least one packet of outgoing traffic to the respective gateway for natting for transmitting the at least one packet to an external server on behalf of the respective gateway.

In some implementations of the method, the at least one packet has been transmitted by the given emitter in response to receiving, from the external server, a link to potentially malicious content.

In some implementations of the method, the encapsulating comprises specifying, for the at least one packet: the IP address of the given emitter at both the WireGuard and GRE levels as being a sender of the at least one packet; the IP address of the respective gateway at the WireGuard level as being an intermediary recipient of the at least one packet; and an IP address of the external server at the GRE level as being a destination recipient of the at least one packet.

In some implementations of the method, the natting comprises specifying, for the at least one packet: (i) the IP address of the respective gateway as being the sender of the at least one packet; and (ii) the IP address of the external server as being the destination recipient of the at least one packet for transmitting the at least one packet to the external server.

In some implementations of the method, the IP address of either one of the given emitter and the respective gateway includes: an Internet IP address; an IP address at the WireGuard level; and an IP address at the GRE level.

In some implementations of the method, the adding the at least one emitter and the at least one gateway to the neighbor table comprises generating, by the at least one central server, a configuration file.

In accordance with a second broad aspect of the present technology, there is provided a method of tunneling traffic in a distributed network for detecting malicious content. The distributed network including at least one central server communicatively coupled to at least one emitter and at least one gateway. The method is executable by a given emitter of the at least one emitter. The method comprises: transmitting, by the given emitter, at least one outgoing traffic packet to the at least one central server, the at least one outgoing traffic packet including at least two levels of encapsulation over a transport protocol implemented for forwarding the at least one outgoing traffic packet, via the at least one central server, to the at least one gateway for natting the at least one outgoing traffic packet for further transmitting the at least one outgoing traffic packet to an external server on behalf of the respective gateway; and in response to receiving, from the external server, via the at least one gateway and the at least one central server, at least one incoming traffic packet, extracting content of the at least one incoming traffic packet for analysis thereof for maliciousness.

In some implementations of the method, the transmitting has been triggered by receiving, by the given emitter, from the external server, a link to potentially malicious content.

In some implementations of the method, prior to the transmitting, the method further comprises receiving, by the given emitter, a configuration file from the at least one central server.

In some implementations of the method, the method further comprises configuring interfaces at the at least two levels using the configuration file.

In some implementations of the method, the at least two levels comprise a WireGuard level and a GRE level.

In some implementations of the method, the method further comprises obtaining, by the given emitter, from the at least one central server, an IP address of the at least one gateway.

In some implementations of the method, the method further comprises setting up at least one route to the external server through the at least one gateway.

In accordance with a third broad aspect of the present technology, there is provided a method for routing traffic within a distributed network for detecting malicious content. The distributed network includes at least one central server communicatively coupled to at least one emitter and at least one gateway. The method is executable by a given gateway of the at least one gateway. The method comprises: in response to receiving, by the given gateway, from the at least one emitter via the at least one central server, at least one outgoing traffic packet, decapsulating the at least one outgoing traffic packet; identifying, by the given gateway, in the at least one outgoing traffic packet, data of an external server for forwarding the at least one outgoing traffic packet thereto, the data having been specified at a GRE level of the at least one outgoing traffic packet; natting, by the given gateway, the at least one outgoing traffic packet, by specifying, for the at least one outgoing traffic packet, an IP address of the given gateway as being a sender of the at least one outgoing traffic packet; transmitting, by the given gateway, the at least one outgoing traffic packet to an external server; and in response to receiving, by the given gateway, at least one incoming traffic packet from the external server, denatting the at least one incoming traffic packet; encapsulating, by the given gateway, the at least one incoming traffic packet at a WireGuard layer and the GRE layer, at least one IP address specified at the WireGuard layer being different from at least one IP address specified at the GRE layer; and transmitting, by the given gateway, via the at least one central server, the at least one incoming traffic packet to the at least one emitter for analyzing content thereof for maliciousness.

In some implementations of the method, the at least one outgoing traffic packet has been transmitted by the at least one emitter in response to receiving, from the external server, a link to potentially maliciousness content.

In some implementations of the method, prior to the receiving, the method further comprises receiving, by the given gateway, a configuration file from the at least one central server.

In some implementations of the method, the method further comprises configuring, by the given gateway, interfaces at the WireGuard level and the GRE level using the configuration file received.

In some implementations of the method, prior to the receiving, the method further comprises receiving an IP address of the at least one emitter received from the at least one central server.

In some implementations of the method, wherein the encapsulating comprises specifying, for the at least one incoming traffic packet: (i) an IP address of the at least one central server at the GRE level; and (ii) an IP address of the at least one emitter at the WireGuard level.

In accordance with a fourth broad aspect of the present technology, there is provided a server of a distributed network for tunneling traffic therein for detecting malicious content. The distributed network is implemented using two-layer tunneling, including a WireGuard level and a GRE level. The server comprises a processor and non-transitory computer-readable medium storing instructions. The processor, upon executing the instructions, is configured to: add at least one emitter and at least one gateway to a neighbor table hosted on the server: the at least one emitter being a peer of the distributed network configured for analyzing malicious content and receiving data packets encapsulated at the WireGuard level and at the GRE level; and the at least one gateway being a peer of the distributed network configured for natting at least one outgoing traffic packet and denatting at least one incoming traffic packet; transmit an IP address of a given emitter of the at least one emitter to a respective gateway of the at least one gateway, the given emitter corresponding to the respective gateway in the neighbor table; transmit an IP address of the respective gateway to the given emitter, the respective gateway corresponding to the given emitter in the neighbor table; in response to receiving at least one packet of outgoing traffic from the given emitter, decapsulate the at least one packet of outgoing traffic; identify at the WireGuard level of the at least one packet of outgoing traffic, the IP address of the respective gateway associated with the given emitter; encapsulate the at least one packet of outgoing traffic at the WireGuard level and the GRE level, at least one IP address specified at the WireGuard level being different from at least one IP address specified at the GRE level; and forward the at least one packet of outgoing traffic to the respective gateway for natting for transmitting the at least one packet to an external server on behalf of the respective gateway.

In some implementations of the server, to encapsulate the at least one packet of outgoing traffic at the WireGuard level and the GRE level, the processor is configured to specify, for the at least one packet: the IP address of the given emitter at both the WireGuard and GRE levels as being a sender of the at least one packet; the IP address of the respective gateway at the WireGuard level as being an intermediary recipient of the at least one packet; and an IP address of the external server at the GRE level as being a destination recipient of the at least one packet.

In some implementations of the server, the natting comprises specifying, for the at least one packet: (i) the IP address of the respective gateway as being the sender of the at least one packet; and (ii) the IP address of the external server as being the destination recipient of the at least one packet for transmitting the at least one packet to the external server.

In some implementations of the server, the IP address of either one of the given emitter and the respective gateway includes: an Internet IP address; an IP address at the WireGuard level; and an IP address at the GRE level.

In some implementations of the server, to add the at least one emitter and the at least one gateway to the neighbor table, the processor is configured to generate a configuration file.

In accordance with a fifth broad aspect of the present technology, there is provided a server of a distributed network for tunneling traffic therein for detecting malicious content. The server is communicatively coupled, via the distributed network, to at least one central server and at least one gateway of the distributed network. The server comprises a processor and non-transitory computer-readable medium storing instructions. The processor, upon executing the instructions, is configured to: transmit at least one outgoing traffic packet to the at least one central server, the at least one outgoing traffic packet including at least two levels of encapsulation over a transport protocol implemented for forwarding the at least one outgoing traffic packet, via the at least one central server, to the at least one gateway for natting the at least one outgoing traffic packet for further transmitting the at least one outgoing traffic packet to an external server on behalf of the respective gateway; and in response to receiving, from the external server, via the at least one gateway and the at least one central server, at least one incoming traffic packet, extracting content of the at least one incoming traffic packet for analysis thereof for maliciousness.

In some implementations of the server, the processor is configured to transmit the at least one outgoing traffic packet in response to receiving, from the external server, a link to potentially malicious content.

In some implementations of the server, prior to transmitting the at least one outgoing traffic packet to the at least one central server, the processor is further configured to receive a configuration file from the at least one central server.

In some implementations of the server, the processor is further configured to configure interfaces at the at least two levels using the configuration file.

In some implementations of the server, the at least two levels comprise a WireGuard level and a GRE level.

In some implementations of the server, the processor is further configured to obtain, from the at least one central server, an IP address of the at least one gateway.

In some implementations of the server, the processor is further configured to set up at least one route to the external server through the at least one gateway.

In accordance with a sixth broad aspect of the present technology, there is provided an electronic device of a distributed network for routing traffic therewithin for detecting malicious content. The electronic device is communicatively coupled, via the distributed network, to at least one central server and at least one emitter of the distributed network. The electronic device comprises a processor and non-transitory computer-readable medium storing instructions. The processor, upon executing the instructions, is configured to: in response to receiving, from the at least one emitter via the at least one central server, at least one outgoing traffic packet, decapsulate the at least one outgoing traffic packet; identify, in the at least one outgoing traffic packet, data of an external server for forwarding the at least one outgoing traffic packet thereto, the data having been specified at a GRE level of the at least one outgoing traffic packet; nat the at least one outgoing traffic packet by specifying, for the at least one outgoing traffic packet, an IP address of the given gateway as being a sender of the at least one outgoing traffic packet; transmit the at least one outgoing traffic packet to an external server; and in response to receiving at least one incoming traffic packet from the external server, denat the at least one incoming traffic packet; encapsulate the at least one incoming traffic packet at a WireGuard layer and the GRE layer, at least one IP address specified at the WireGuard layer being different from at least one IP address specified at the GRE layer; and transmit, via the at least one central server, the at least one incoming traffic packet to the at least one emitter for analyzing content thereof for maliciousness.

In some implementations of the electronic device, prior to receiving the at least one outgoing traffic packet, the processor is further configured to receive a configuration file from the at least one central server.

In some implementations of the electronic device, the processor is further configured to configure interfaces at the WireGuard level and the GRE level using the configuration file received.

In some implementations of the electronic device, prior to receiving the at least one outgoing traffic packet, the processor is further configured to receive an IP address of the at least one emitter received from the at least one central server.

In some implementations of the electronic device, to encapsulate the at least one incoming traffic packet, the processor is configured to specify, for the at least one incoming traffic packet: (i) an IP address of the at least one central server at the GRE level; and (ii) an IP address of the at least one emitter at the WireGuard level.

In the context of the present specification, the terms "network resource" and "web resource", unless specified otherwise, denote any element or a combination of elements of the World Wide Web that can potentially be accessible through the Internet. Even if an element is stored in an encrypted form and on a closed server, it is potentially accessible; therefore, it also comprises a network resource. Within the context of this description, the terms "network resource" and "web resource" further denote any data or data set that can be supplied through the network and are associated with the network resource address. Non-limiting examples of the network resources are HTML pages, documents, images, video recordings, news feeds or the combinations of the above files. The network resources can include content, e.g., words, phrases, images etc. and/or integrated information, e.g., meta data, hyperlinks and/or integrated instructions (e.g., JavaScript scenarios).

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Further, in the context of the present specification, unless expressly stated otherwise, the terms listed below are defined as follows:
- a central server is a server in a distributed network, which hosts a neighbor table for configuring routing and issue IP addresses within the distributed network;
- a gateway is a peer of the distributed network implemented to nat packets of outgoing traffic;
- an emitter is a peer of the distributed network executing one or more sandbox environments;
- a peer is a member of the distributed network, for example, a gateway or emitter;
- natting is a network address modification, a mechanism implemented at the transport level of networks allowing to modify IP addresses of transit packets;
- tunneling is a networking technique where one network protocol is encapsulated within another. The essence of tunneling is to "pack" a portion of data to be transmitted, together with service fields, into the payload area of the carrier protocol packet.
- an encapsulation is a method of building modular network protocols where logically independent network functions are abstracted from underlying mechanisms by including or encapsulating these mechanisms in higher-level objects.
- a neighbor table is a table hosted by the central server of the distributed network that stores records of the correspondence of IP addresses at the GRE level to IP addresses at the WireGuard level. An analogue of the neighbor table is the Address Resolution Protocol (ARP) table, which stores records about the correspondence of IP addresses to MAC addresses. The operating system (OS) of the central server requests these tables during routing packets in order to obtain the destination address at the underlying network level.
- an interface is an interface of interaction with the WireGuard or GRE software; and
- a polygon is a set of isolated environments for detection and analysis of potentially malicious content.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

Figure 1:
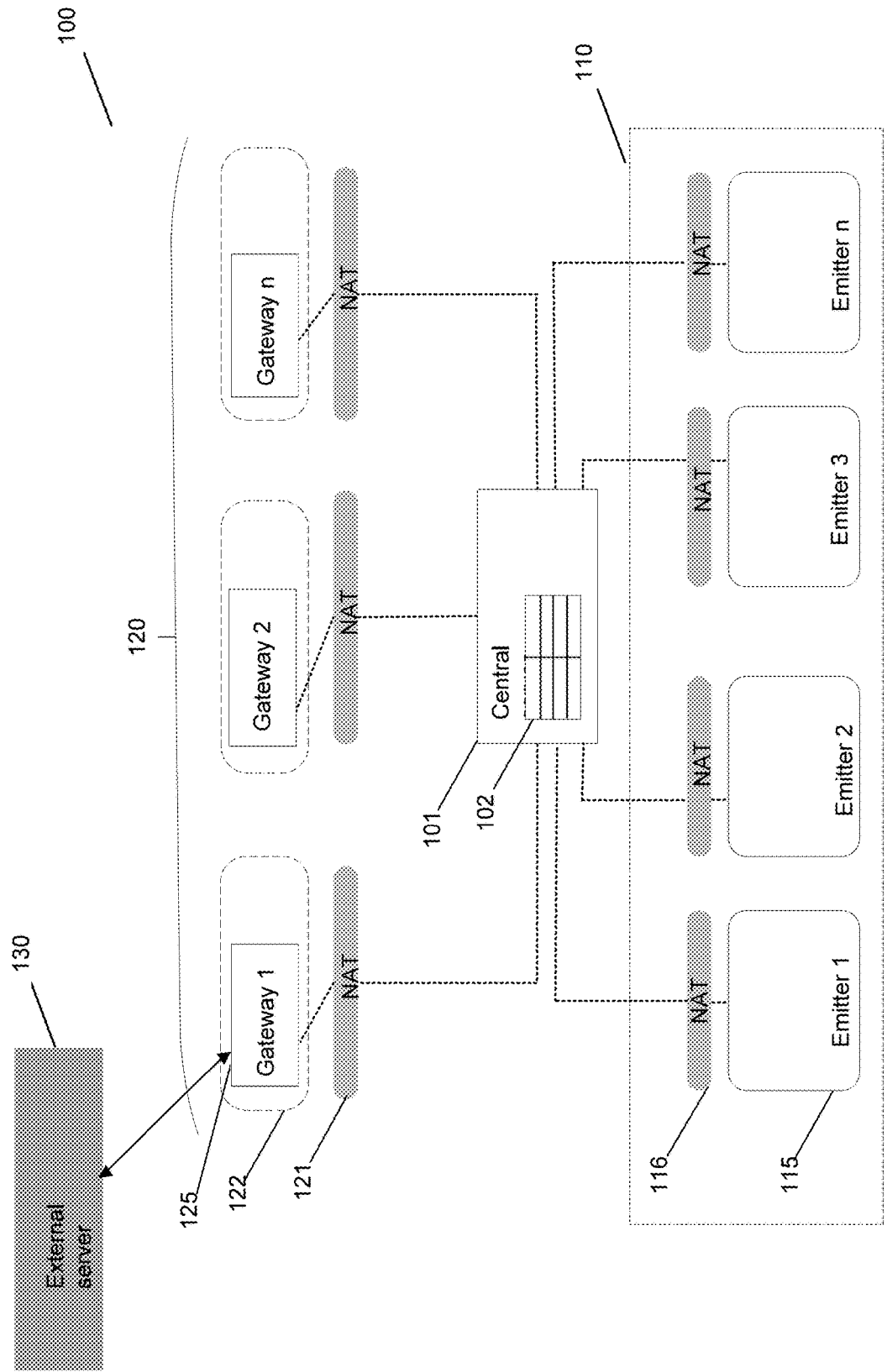
FIG. 1 depicts a schematic diagram of a distributed network, in accordance with certain non-limiting embodiments of the present technology.

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to a system and method of traffic tunneling in a distributed network in such a way that outgoing traffic packets are natted at the output of the distributed network and the packets are forwarded to an external IP address so that the sender's IP address would be different from the actual IP address of the device that has sent the traffic packets.

Let's consider the following example: a bank "X" requests a company "G" to provide services in the field of cybersecurity, more specifically, outsource analysis of suspicious content incoming from external resources. In this case, the company "G" can provide the bank with an opportunity to use its polygon. The company "G" provides one or more sandboxes located in the polygon to serve the request of the bank "X". The distributed network of the polygon is designed in such a way that, upon request from the bank "X", a route is built to one or more isolated environments located in polygon, and suspicious traffic from the bank "X" is analyzed in these isolated environments. Tunneling within the distributed network is implemented in such a way that each packet of outgoing traffic is natted at the output from the distributed network of the company "G" to be sent on behalf of the bank "X", that is, with the IP address of bank "X" being indicated as the sender. Thus, an attacker that has sent malicious content to the IP address of the bank "X", for example, a malicious file or a link to a malicious website, as a result of analysis and detection (activation) of this file or clicking on the link, will receive a request at their server from the bank's IP address "X", not from the IP address of the polygon of the company "G". Thus, the server of the attackers will not be able to detect the isolated environment of the company "G" and can thus send fully operating malware thereto, such as a file, which can be subject to further analysis. For example, upon receiving this file, the server of the company "G" can be configured to identify the server of the attackers as being malicious.

As previously mentioned, the polygon can include a plurality of isolated environments (sandboxes) initialized in the distributed network. The isolated environments can be distributed among multiple clients, one of which can be the bank "X". At the output of the distributed network, the data packet originating from each of the isolated environments is natted and sent to an external server (which can potentially be malicious) with an IP address corresponding to the addresses of the network infrastructure of a given company, for example, in this case, the bank "X".

An implementation of the method will be further described in detail on the example of the interaction of one isolated environment installed on one emitter and one gateway. But it needs to be understood that in an actual operating polygon, many emitters and many gateways can be implemented, wherein the emitters and gateways can perform the actions described below for many client companies.

According to certain non-limiting embodiments of the present technology, the infrastructure of the company "G" includes a central server and at least one emitter that are configured to route and analyze potentially malicious traffic entering the local network of the bank "X". The local network of the bank "G" can include at least one gateway, which is an electronic device configured to forward all or part of the traffic for analysis to the infrastructure of the company "G", that is, to the given emitter of the at least one emitter. Traffic forwarding is implemented by routing it through the central server. In the so organized distributed network between the infrastructure of the company "G" and the local network of the bank "X", the central server is a gateway for peers. A gateway is used by peers to forward packets to the destination on behalf of the peers, where IP address of the destination is unknown to peers. Thus, when a given gateway, from the local network of the bank "X", needs to send a data packet for analysis to one of the emitters that are part of the infrastructure of company "G", the given gateway forwards the packet, first, to the central server, which, in turn, is configured to forward the received packet to the respective emitter. In some non-limiting embodiments of the present technology, the respective emitter can be pre-associated with the given gateway, such as in a neighbor table of the central server, as will be described below.

With reference to FIG. 1, there is depicted a schematic diagram of the distributed network 100 between a given cybersecurity company, such as the company "G", and a local network of a client company, such as the bank "X" mentioned above, in accordance with certain non-limiting embodiments of the present technology. As shown in FIG. 1, a polygon of emitters 110 for malicious content analysis includes emitters, such as a given emitter 115. A neighbor table 102, which is stored on a central server 101 of the distributed network, includes the information needed to build routes between peers of the distributed network, such as the polygon the polygon of emitters 110 and gateways 120. It is not limited how the neighbor table 102 is implemented, and in some non-limiting embodiments of the present technology, the neighbor table may be implemented similarly to a table of MAC addresses. In one implementation, neighbor tables may also be stored on at least one of a given gateway of the gateways 120 and the given emitter 115 of the polygon of emitters 110.

It should be noted that, according to certain non-limiting embodiments of the present technology, exchange of information between all devices of the distributed network 100, that is, the central server 101, the polygon of emitters 110, and the gateways 120 is carried out through a computer network (not depicted), such as, for example, the Internet. Similarly, information can be exchanged between devices of the distributed network 100 and any external (relative to the distributed network 100) computing devices, such as, for example, an external server 130. Implementation of communication links between the components of the distributed network 100, such as wired and/or wireless, depend generally on the implementations of the components themselves.

Further, according to certain non-limiting embodiments of the present technology, each emitter of the polygon of emitters 110, such as the given emitter 115 may comprise an electronic device capable of implementing a given task at hand. For example, in various non-limiting embodiments of the present technology, the given emitter 115 can comprise a personal computer, a laptop, a tablet, a smartphone, and the like. To that end, the given emitter 115 can include some or all components of a computing environment 500, which will be described below with reference to FIG. 5. According to certain non-limiting embodiments of the present technology, the given emitter 115 can be configured to execute an isolated environment (such as a sandbox), which is configured for detecting suspicious content (not depicted). In some non-limiting embodiments of the present technology, the given emitter 115 can be implemented as a computer server, such as Dell™ PowerEdge™ Server running the Microsoft™ Windows Server™ operating system but can also be implemented in any other suitable hardware, software, and/or firmware, or a combination thereof.

Further, according to certain non-limiting embodiments of the present technology, each one of the gateways 120, such as a given gateway 125 is located in a local network 122 of the client company. According to certain non-limiting embodiments of the present technology, the given gateway 125 comprises an electronic device, which can be implemented similarly to the given emitter 115. In some non-limiting embodiments of the present technology, as will be described in detail below, the given gateway 125 can be configured nat the packets of outgoing traffic, that is, replace the sender's IP address (such as that of the given emitter 115) with its own IP address, thereby sending the packets of outgoing traffic on its behalf.

Figure 5:
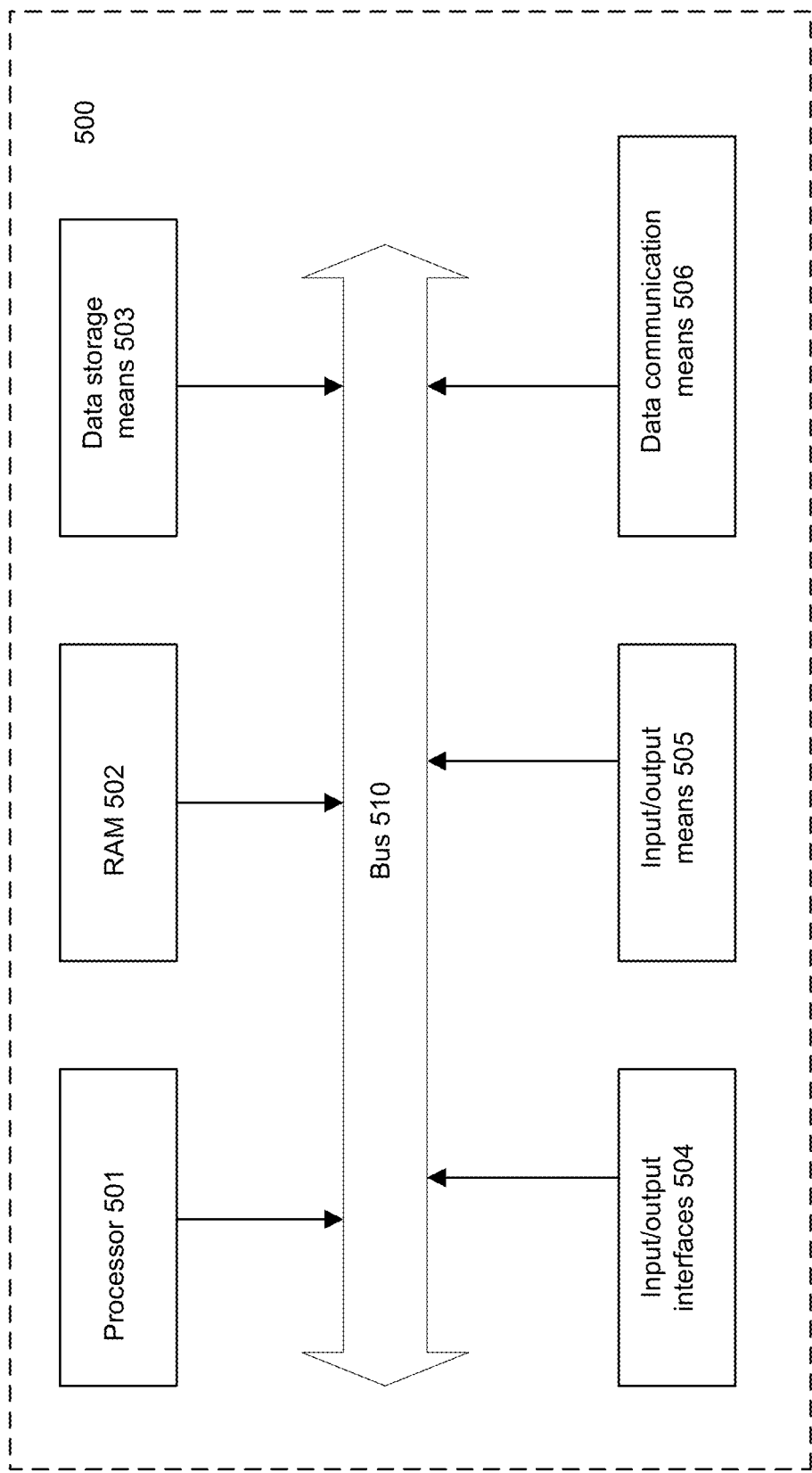
FIG. 5 depicts a schematic diagram of an example computing environment configurable for execution of the stages of the present method of FIGS. 3, 4A, and 4B, in accordance with certain non-limiting embodiments of the present technology.

Further, each one of the central server 101 and the external server 130 can be implemented as a conventional computer server and may comprise some or all of the components of the computing environment 500 schematically depicted in FIG. 5. In a specific non-limiting example, a given one of the central server 101 and the external server 130 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the given one of the central server 101 and the external server 130 is a single server. In alternative non-limiting embodiments of the present technology (not depicted), the functionality of the given one of the central server 101 and the external server 130 may be distributed and may be implemented via multiple servers.

According to certain non-limiting embodiments of the present technology, the routing of the traffic in the distributed network 100 is organized such that none of the gateways 120, can communicate with other gateways. Similarly, none of the polygon 110 emitters can communicate with other emitters. Further, in some non-limiting embodiments of the present technology, a given route can connect the given emitter 115 and the given gateway 125 and back through the central server 101.

Returning to the example above where the client company is the bank "X", according to certain non-limiting embodiments of the present technology, the routing can be organized so that the given gateway 125, located in the local network 122 of the bank "X", is not able to communicate with other ones of the gateways 120, which, for example, may belong to other client companies of the cybersecurity company. In general, the given gateway 125 is technically able to send and receive data from any emitter of the polygons of emitters 110 and from the central server 101. However, in some non-limiting embodiments of the present technology, the given gateway 125 can be uniquely associated only with the given emitter 115; and as such, the traffic from the given gateway 125 can be routed, within the distributed network 110, only to the given emitter 115. Therefore, within the framework of the considered non-limiting example, the route for the given gateway 125 of bank "X" is configured so that data is transmitted from the given emitter 115 first to the central server 101, then from the central server 101 to the given gateway 125.

It should be noted that certain non-limiting embodiments of the present technology are based on a premise that the central server 101 of the distributed network 100 has a public IP address. Further, in some non-limiting embodiments of the present technology, the given gateway 125 may be located behind a second natting procedure 121 and not have a public IP address. Likewise, the given emitter 115 may be located behind a first natting procedure 116 and not have a public IP address.

In alternative non-limiting embodiments of the present technology, both the given gateway 125 and the given emitter 115 may have their own public IP addresses and may not be located behind a nat.

Next, traffic routing between the client company, such as the bank "X", and the cybersecurity company, such as the company "G" mentioned above in the distributed network 100 will be described in detail.

First, a request to the external server 130, located outside of the distributed network 100, can be generated at the given emitter 115. This request to the external server 130 can be, for example, triggered by the given emitter 115 in response to receiving an external link from an email received from the external server 130. As the external server 130 is potentially an attacker's server, it may be required to analyze the content received therefrom for maliciousness. Thus, according to certain non-limiting embodiments of the present technology, the given emitter 115, executing the isolated environment, can be configured to send the request as a packet of outgoing data to the central server 101. Further, the central server 101 can be configured to forward the packet of outgoing data to the given gateway 125. The given gateway 125 replaces the IP address of the sender to the IP address of the local network 122 of the client company (or to the IP address belonging to the network, such as that of the given gateway 125 itself) 122 in which the given gateway 125 is located and forwards the packet to the external server 130. Due to the replacement described, the IP address of the packet's sender (which can be analyzed on the external server 130) will have nothing in common with the IP address of the given emitter 115, so the attacker will not know that the opening of the letter and clicking on the link, for example, triggered the transmission of the packet to the external server 130, has occurred in the isolated environment of the given emitter 115, and not within one of the devices from the local network 122 attacked.

Thus, when the external server 130 receives the packet, it is the IP address of the local network 122 (such as that of the given gateway 125) that the external server 130 will determine as the sender's address. Due to the replacement of the IP address, the distributed network 100 will imitate the local network 122 of the client company for the attacker. The external server 130, if it belongs to the attackers, sends malicious content in response to a request (following a link), for example, a link in an email that has been clicked on. An incoming traffic packet, which may contain malicious content, will then be transmitted to the given gateway 125. The given gateway 125 will forward the packet to the central server 101. The central server 101 will forward the packet to the given emitter 115. Thus, the given emitter 115 will receive the packet of incoming traffic potentially containing malicious content. The given emitter 115 can be configured to unpack the packet in its isolated environment for further analysis thereof, without posing any threat to the gateways 120 and to the local network 122.

In the above example, the following occurs. An email from an unknown sender can be received in the bank "X" local network. The email may contain a link for downloading the file. The email is then redirected for analysis to an isolated environment installed, for example, on the given emitter 115. In response, the given emitter 115 can be configured to cause a transition by the link contained in the email, resulting in a request being sent to the external server 130 to download the file. The request is automatically forwarded first to the central server 101, then, for example, to the given gateway 125. The given gateway 125 installed in the local network 122 under attack is configured to replace the IP address of the given emitter 115 with an IP address of the local network 122 of the bank "X", such as with its own IP address, for example, and forward the packet to the external server 130, possibly belonging to the attacker.

Further, the external server 130, upon receipt of the packet from the given gateway 125, can be configured to determine, in the packet, the IP address of the local network 122 of the bank "X" specified as being the sender of the packet. And in response to the request received, the external server 130 can thus be configured to transmit a package containing a potentially malicious file. The incoming data packet is received at the given gateway 125 and sent further to the given emitter 115 not directly, but through a hoop, which functions are performed by the central server 101.

According to certain non-limiting embodiments of the present technology, forwarding packets between the network actors: the given emitter 115, the central server 101 and the given gateway 125, can be executed by traffic tunneling, that is, repackaging of the packet at several data transferring levels. Certain non-limiting embodiments of the present technology are directed to two data transferring interfaces over an Internet connection, including a WireGuard level and a Generic Routing Encapsulation (GRE) level. In the context of the present specification, the WireGuard and GRE denote both communication protocols and software for implementing these protocols. Both types of software have interfaces through which they are configured.

Given the architecture and examples provided hereinabove, it is now possible to implement a method of tunnelling the traffic in a distributed network, such as the distributed network 100 described above with reference to FIG. 1. Certain steps of the present method can be implemented by a processor (such as a processor 501 of the computing environment 500 described below) a respective one of the central server 101, the given emitter 115, and the given gateway 125.

According to certain non-limiting embodiments of the present technology, the present method includes three stages: a preparation stage, a first stage, and a second stage. At the preparation stage, according to certain non-limiting embodiments of the present technology, each one of the given emitter 115 and the given gateway, 125 can be configured to set up the interfaces and routes therebetween; and the central server 101 can be configured to register the IP addresses of the given emitter 115 and the given gateway 125 in the neighbor table 102.

Figure 3:
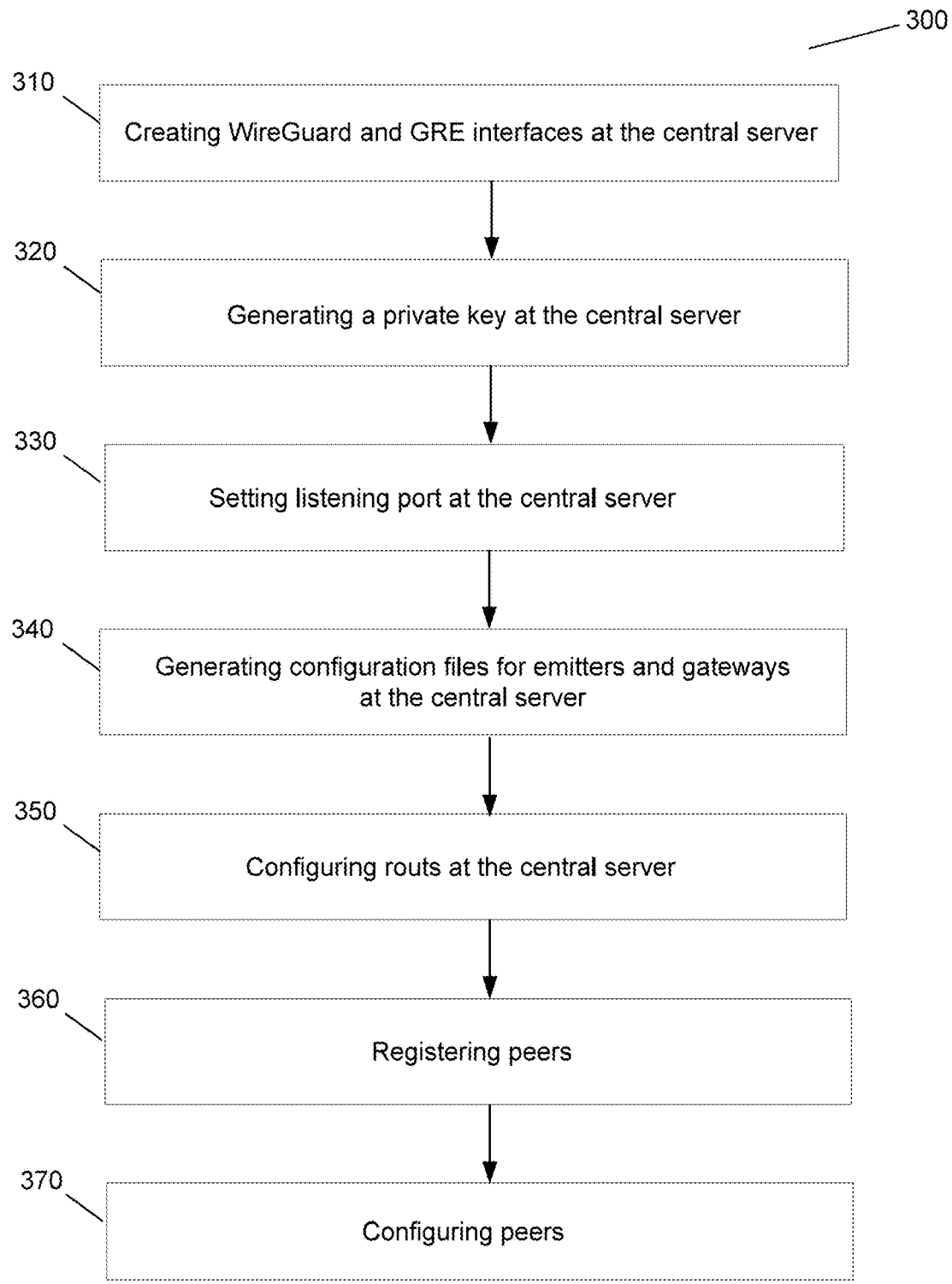
FIG. 3 depicts a flowchart diagram of a preparation stage of the present method of tunneling the traffic in the distributed network of FIG. 1, in accordance with certain non-limiting embodiments of the present technology.

With reference to FIG. 3, there is depicted a flowchart diagram of a preparation stage 300 of the present method of tunneling the traffic in the distributed network 100, in accordance with certain non-limiting embodiments of the present technology. As mentioned above, different steps of the preparation stage 300 can be executed by the respective one of the central server 101, given emitter 115, and the given gateway 125.

Step 310: Creating Wireguard and Gre Interfaces at the Central Server

The preparation stage 300 commences at step 310 where the central server 101 is configured to create two interfaces, WireGuard and GRE. The GRE interface is specified as running on top of the WireGuard interface. With this setting, packets in the distributed network 100 are encapsulated in the following order: UDP, WireGuard, GRE.

The preparation stage 300 hence proceeds to step 320.

Step 320: Generating a Private Key at the Central Server

At step 320, the central server 101 can be configured to generate a private key on the WireGuard interface.

The preparation stage 300 of the present method hence advances to step 330.

Step 330: Setting Listening Port at the Central Server

At step 330, according to certain non-limiting embodiments of the present technology, the central server 101 can be configured to set, for the WireGuard interface, using the appropriate command, a listening port that indicates which server port of the central server 101 listens for incoming connections.

The preparation stage 300 of the present method hence advances to step 340.

Step 340: Generating Configuration Files for Emitters and Gateways at the Central Server At step 340, according to certain non-limiting embodiments of the present technology, the central server 101 can be configured to generate configuration files for the central server 101 itself, as well as for all emitters of the polygon of emitters 110 and for all of the gateways 120.

Figure 2:
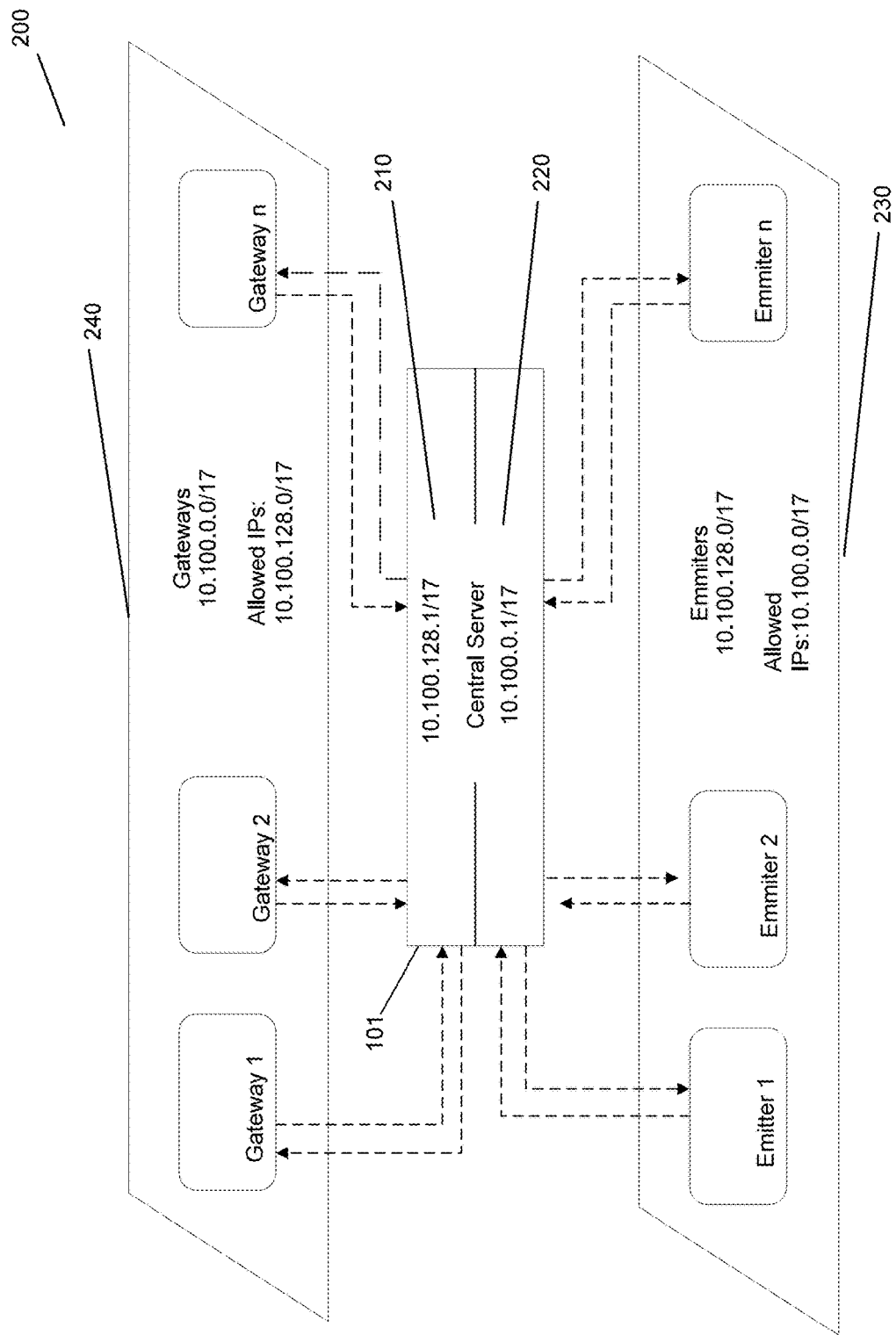
FIG. 2 depicts a schematic diagram of routing traffic within the distributed network of FIG. 1, in accordance with certain non-limiting embodiments of the present technology.

More specifically, according to certain non-limiting embodiments of the present technology, a given configuration file generated by the central server 101 includes the IP addresses of the central server 101 for the WireGuard and GRE interfaces. As schematically depicted in FIG. 2, at the WireGuard level, the central server 101 has two IP addresses, a first IP address 210 of which is intended for interaction with the gateways 120, and a second IP address 220, which is intended for interaction with the polygon of emitters 110. In the example of FIG. 2, at the WireGuard level, the first IP address is 10.100.128.1/17 is assigned to the central server 101 to interact with the gateway subnet 240 of the gateways 120, which has the IP address 10.100.0.0/17, at the same time, the central server 101 is assigned with the second IP address 10.100.0.1/17 to interact with an emitter subnet 230 of the polygon of emitters 110, which has an IP address 10.100.128.0/17.

It should be noted that devices that are, for example, certain ones of the gateways 120 located at the WireGuard level in the same subnet 240 may physically be located in different cities or even different countries. Likewise, certain ones of the polygon of emitters 110 located at the WireGuard level on the same subnet 230 can be located anywhere in the world.

Further, according to certain non-limiting embodiments of the present technology, the given configuration file can further include information on the subnets of the distributed network 100. Subnets are lists of IP addresses from which peers, that is, emitters and gateways, will be assigned IP addresses when they are subsequently configured. Specification of subnets in the given configuration file of the central server 101 determines the ability of the central server 101 to receive packets from the specified subnet and transmit packets to the specified subnets. It should be noted that the polygon of emitters 110 and the gateways 120 may be organized indifferent subnets at the WireGuard level, respectively. For example, as can be appreciated from FIG. 2, the polygon of emitters 110 belong to the emitter subnet 230, and the gateways 120 belong to the gateway subnet 240. Thus, assigning, by the central server 101, different IP addresses from non-overlapping subnets to each one of the polygons emitters 110 and the gateways 120 at the WireGuard level allows to configure routes so that a given one of the polygon of emitters 110 can transmit packets to the gateways 120 and cannot transmit packets, for example, to other emitters. For the same reason, the gateways 120 will be able to transmit packets to respective ones of the polygon of emitters 110 and will not be able to transmit packets to other ones of the gateways 120. This is necessary so that different owners of different local networks, for example, competing banks, cannot access each other's local network and nat through competitors' gateways.

Also, in some non-limiting embodiments of the present technology, the given configuration file can also specify a UDP port on which the central server 101 listens for incoming WireGuard packets.

Thus, the preparation stage 300 of the present method advances to step 350.

Step 350: Configuring Routs at the Central Server

At step 350, the central server 101 can be configured to perform route configuration at the WireGuard level and at the GRE level. As noted above, according to certain non-limiting embodiments of the present technology, the GRE level runs on top of the WireGuard level, which, in turn, runs on top of the UDP level. This means that, in these embodiments, all packets are processed firstly at the UDP level, then at the WireGuard level, and only then all packets are processed at the GRE level.

As further shown in FIG. 2, at the WireGuard level, the routes on the central server 101 are configured in such a way that all packets that the central server 101 sends to the emitter subnet 230 are sent from the second IP address 220. Similarly, all packets that the central server 101 sends to the gateway subnet 240 are sent from the first IP address 210.

At the GRE level (not shown in FIG. 2), according to certain non-limiting embodiments of the present technology, the central server 101 is assigned a single IP address. Similarly, in some non-limiting embodiments of the present technology, the central server 101 can be configured to assign a single respective address to each of the gateways 120 and the polygon of emitters 110. Also, in some non-limiting embodiments of the present technology, and at the GRE level, the IP addresses of the gateways 120 and the polygon of emitters 110 are not organized into different subnets as at the WireGuard level, they all are on the same subnet.

Thus, the preparation stage 300 of the present method advances to step 360.

Step 360: Registering Peers

At step 360, the central server 101 can be configured to register peers, i.e. emitters and gateways, by sending requests to a management interface. The management interface is an interaction interface for managing peers in the distributed network 100: it allows to add, remove, and get information about current peers. In order to register each peer through the management interface, the central server 101 can be configured to execute the following actions:
  generating a private key for a given peer,
  generating a public key based on the private key,
  allocating IP addresses for the given peer at the WireGuard level,
  adding pairs from the public key and the given peer's IP address to the WireGuard interface,
  allocating IP addresses for the given peer at the GRE level,
  adding correspondences of the IP addresses of the given peer at the WireGuard and GRE levels the neighbor table,
  adding a correspondence of the public key of the IP addresses of the given peer at the WireGuard and GRE levels to a correspondence database.

According to certain non-limiting embodiments of the present technology, the central server 101 can be configured to execute the above-listed actions by running the given configuration file from time to time, for example, according to a predetermined schedule.

In response to the request to register the given peer on the central server 101, the central server 101 can be configured to generate a respective configuration file including a private key, a pair of IP addresses at the WireGuard and GRE levels, information about the central server 101, including its public key, as well as the address and UDP port on which the central server 101 listens for incoming WireGuard packets. Further, the central server 101 can be configured to transmit the respective configuration file to the given peer of the distributed network 100. In response to receiving the respective configuration file, the given peer can be configured to execute the respective configuration file.

Thus, the preparation stage 300 of the present method advances to step 370.

Step 370: Configuring Peers

At step 370, the peers of the distributed network 100, i.e., the polygon of emitters 110 and the gateways 120, can be configured to execute their respective configuration files for configuration thereof. To do this, in some non-limiting embodiments of the present technology, the given peer can be configured to execute a wg-quick utility through a script, which raises the WireGuard interface and configures it in accordance with the settings saved in the respective configuration file.

The example of an emitter configuration file, such as that of the given emitter 115, is provided below.

```
[Interface]
PrivateKey=KBUsKrU/
  7hfs9e40hetklGg9VI1D1v9SU4PNybpH7mU=
Address=10.100.128.2/17
PostUp=ip link add mgre_%i type gre key 0xfffffffe dev %i
PostUp=ip address add 10.101.0.4/16 dev mgre_%i
PostUp=ip link set mgre_%i up
PostUp=ip neighbour replace 10.101.0.1 lladdr
  10.100.0.1 dev mgre_%i
PostUp=ip route replace 10.101.0.0/16 via 10.101.0.1 dev
  mgre_%i
PostUp=iptables --insert INPUT --protocol udp --dport
  $(wg show %i listen-port) --jump ACCEPT
PostUp=iptables --insert INPUT --in-interface %i --jump
  ACCEPT
PostUp=iptables --insert INPUT --in-interface mgre_%i
  --jump ACCEPT
PostUp=iptables --insert FORWARD --in-interface
  mgre_%i --jump ACCEPT
PostUp=iptables --insert FORWARD --out-interface
  mgre_%i --jump ACCEPT
PreDown=iptables --delete FORWARD --out-interface
  mgre_%i --jump ACCEPT
PreDown=iptables --delete FORWARD --in-interface
  mgre_%i --jump ACCEPT
PreDown=iptables --delete INPUT --in-interface
  mgre_%i --jump ACCEPT
PreDown=iptables --delete INPUT --in-interface
  %i --jump ACCEPT
PreDown=iptables --delete INPUT --protocol udp --dport
  $(wg show %i listen-port) --jump ACCEPT
PreDown=ip link delete mgre_%i
[Peer]
# Core server
PublicKey=/HjUlZdftSjf+
  B8iqKz3ypJVNhqyaiqMMOLVhWSw4n0=
AllowedIPs=10.100.0.0/17
PersistentKeepAlive=5
```

The example of a gateway configuration file, such as that of the given gateway 125 is provided below.

```
[Interface]
PrivateKey=wDoY6RX74y+
  BIO8E080xGlqj5YpurSv8kZKGqbwsB28=
Address=10.100.0.2/17
PostUp=ip link add mgre_%i type gre key 0xfffffffe dev %i
PostUp=ip address add 10.101.0.2/16 dev mgre_%i
PostUp=ip link set mgre_%i up
PostUp=ip neighbour replace 10.101.0.1 lladdr
  10.100.128.1 dev mgre_%i
PostUp=ip route replace 10.101.0.0/16 via 10.101.0.1 dev
  mgre_%i
PostUp=iptables --insert INPUT --protocol udp --dport
  $(wg show %ilisten-port) --jump ACCEPT
PostUp=iptables --insert INPUT --in-interface %i --jump
  ACCEPT
PostUp=iptables --insert INPUT --in-interface mgre_%i
  --jump ACCEPT
PostUp=iptables --insert FORWARD --in-interface
  mgre_%i --jump ACCEPT
PostUp=iptables --insert FORWARD --out-interface
  mgre_%i --jump ACCEPT
PostUp=iptables --table nat --insert POSTROUTING
  --source 10.101.0.0/16 --jump MASQUERADE
PreDown=iptables --table nat --delete POSTROUTING
  --source 10.101.0.0/16 --jump MASQUERADE
PreDown=iptables --delete FORWARD --out-interface
  mgre_%i --jump ACCEPT
PreDown=iptables --delete FORWARD --in-interface
  mgre_%i --jump ACCEPT
PreDown=iptables --delete INPUT --in-interface
  mgre_%i --jump ACCEPT
PreDown=iptables --delete INPUT --in-interface %i
  --jump ACCEPT
PreDown=iptables --delete INPUT --protocol udp --dport
  $(wg show %i listen-port) --jump ACCEPT
PreDown=ip link delete mgre_%i
[Peer]
# Core server
PublicKey=/HjUlZdftSjf+
  B8iqKz3ypJVNhqyaiqMMOLVhWSw4n0=
AllowedIPs=10.100.128.0/17
Endpoint=poligon.g.com:51820
PersistentKeepAlive=5
```

According to certain non-limiting embodiments of the present technology, by executing the wg-utility for the emitter configuration file, the given emitter 115 can be configured to:
- create a WireGuard interface,
- assign and specify a private key in the respective configuration file,
- assign an IP address to the WireGuard interface,
- add the central server 101 as a peer, located at the second IP address 220 specified in the respective configuration file, with the public key specified and the subnet of IP addresses allowed;
- create GRE interface that is run on top of the WireGuard interface created earlier.
- assign the IP address specified to the GRE interface,
- add a correspondence between the IP addresses of the central server 101 at the WireGuard and GRE levels to the neighbor table,
- establish routes to all addresses in the GRE subnet through the hoop (central server 101), and
- add firewall rules that allow packets to be received and sent through the created WireGuard and GRE interfaces.

Similarly, the given gateway 125 can be configured to use the w-g utility for performing self-configuration. However, in some non-limiting embodiments of the present technology, additional step can be executed, including: adding firewall rules natting packets that come from the GRE subnet. When configuring the given gateway 125, the respective configuration file can be launched in the local network 122 of the client company, on the computing device, for example, a laptop, which acts as the given gateway 125.

The preparation stage 300 of the present method hence terminates.

Figure 4A:
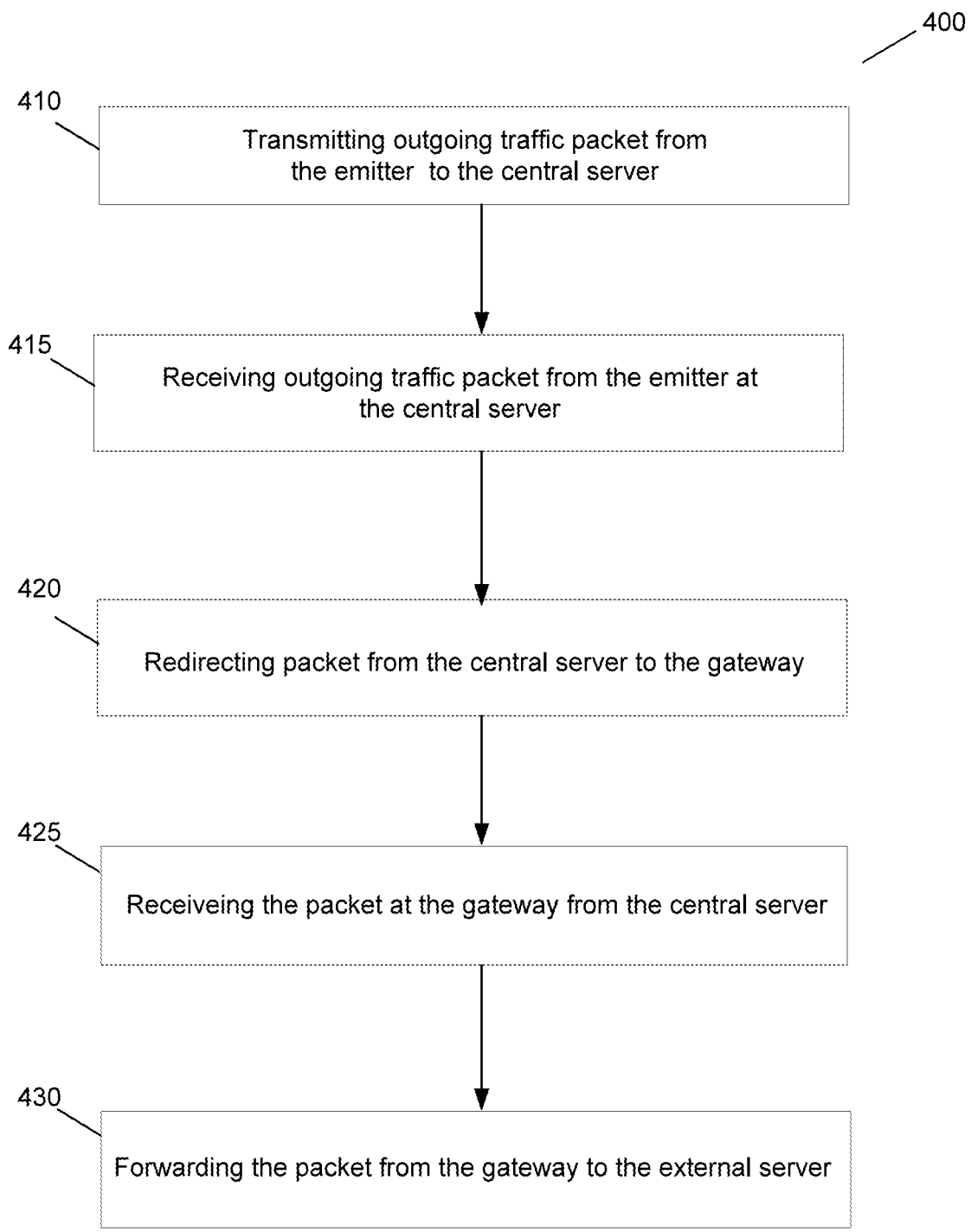
FIG. 4A depicts a flowchart diagram of a first stage of the present method, including transmitting outgoing traffic from the distributed network to an external server, in accordance with certain non-limiting embodiments of the present technology.

Further, the present method proceeds to execute the first (working) stage, such as a first stage 400, flowchart diagram of which is depicted in FIG. 4A, in accordance with certain non-limiting embodiments of the present technology.

Step 410: Transmitting Outgoing Traffic Packet from the Emitter to the Central Server The first stage 400 commences at step 410 with the given emitter 115 transmitting an outgoing traffic packet to the central server 101. This outgoing traffic packet contains a payload that is destined for the external server 130. For example, the given emitter 115 can be configured to generate the outgoing traffic packet for the external server 130 in response to receiving therefrom and further activating (such as opening, launching, and the like) a link or a document that may be malicious.

According to certain non-limiting embodiments of the present technology, prior to transmitting, the given emitter 115 can be configured to encapsulate the outgoing traffic packet so that the outgoing traffic packet has the following form:
- a payload level;
- a GRE level, where: as a source IP address the IP address of the given emitter 115 is specified at the GRE level; as a destination IP address the IP address of the external server 130 is specified;
- a WireGuard level, where: as the source IP address, the IP address of the given emitter 115 is specified at the WireGuard level; as the recipient IP address, the IP address of the given gateway 125, associated with the given emitter 115, is specified at the WireGuard level;
- a UDP layer, where: in a sender field of a UDP packets header, the WireGuard port of the given emitter 115 is specified, and in a receiver field, the WireGuard port of the central server 101 is specified; and
- an Internet connection level, where: the local IP address of the given emitter 115 is specified as the source IP address; and the public IP address of the central server 101 is specified as the destination IP address.

In some non-limiting embodiments of the present technology, as shown in FIG. 1, the given emitter 115 may be located behind the first natting procedure 116, and thus, and may not have a public IP address. In this case, the given emitter 115 can be configured to specify its local IP address as the sender IP address in the outgoing traffic packet at the Internet connection level. And when the packet is sent, the nat is performed and the local IP address of the given emitter 115 specified as the source IP address at the Internet connection level, is replaced with the public IP address of the given emitter 115.

However, in other non-limiting embodiments of the present technology, the given emitter 115 may have a public IP address. In this case, the given emitter 115 may be configured to specify its public IP address as the sender IP address at the level of the Internet connection, and natting is not performed.

In the example provided above, an analysis of data received from the local network 122 of the bank "X" is performed at the given emitter 115. More specifically, an email sent by an unknown sender to an employee of the bank "X" is redirected for the analysis to the company "G", namely, to an isolated environment on the given emitter 115. On the given emitter 115, the outgoing traffic packet including a link (request) to the external server 130 is generated, and the execution of this request can mean downloading a potentially malicious file from the external server 130. The request to the external server 130 is formed on the given emitter 115 to have the potentially malicious file transmitted in response to the request from the external server 130 arrived at the given emitter 115 and not to the user's machine on the local network 122, because the given emitter 115 is configured to analyze such files.

The first phase 400 of the method hence proceeds to step 415.

Step 415: Receiving Outgoing Traffic Packet from the Emitter at the Central Server At step 415, according to certain non-limiting embodiments of the present technology, the central server 101 is configured to receive the outgoing traffic packet from the given emitter 115. In response to receiving the outgoing traffic packet, the central server 101 decapsulates it and identifies the destination IP address at the WireGuard level. In other words, at step 415, the central server 101 of the company "G" receives the next data packet from the emitter that was previously configured to analyze suspicious traffic coming from the local network 122 of the bank "X".

The first stage 400 of the method hence proceeds to step 420.

Step 420: Redirecting Packet from the Central Server to the Gateway

At step 420, in response to receiving the outgoing traffic packet from the given emitter 115, in some non-limiting embodiments of the present technology, the central server 101 can be configured to: (i) identify the IP address of the given gateway 125 as a destination at the WireGuard level of the outgoing traffic packet; and (ii) forward outgoing traffic packet to the given gateway 125. To that end, the central server 101 can be configured to encapsulate the outgoing traffic packet so as the outgoing traffic packet has the following form:

the payload level;
the GRE level, where: the IP address of the given 115 is specified as the source IP address at the GRE level, the IP address of the external server 130 is specified as the destination IP address;
the WireGuard layer, where: the IP address of the given emitter 115 is specified as the source IP address at WireGuard layer, the IP address of the given gateway 125 is specified as the destination IP address at the WireGuard layer; and
the Internet connection level, where: the public IP address of the central server 101 is specified as the sender IP address, the IP address of the given gateway 125 is specified as the destination IP address.

In some non-limiting embodiments of the present technology, as shown in FIG. 1, the given gateway 125 may be located behind the second natting procedure 121 and may not have its public IP address. In this case, in the outgoing traffic packet at the level of the Internet connection, the public IP address of the given gateway 125 is specified as the destination IP address, and denatting is performed when the packet is transmitted.

In other non-limiting embodiments of the present technology, the given gateway 125 may have a public IP address. In this case, this public IP address is specified as the sender at the Internet connection level and no denatting is further performed.

In other words, at step 420, the central server 101 of the company "G" redirects the request received from the given emitter 115, which was configured to process suspicious traffic of the bank "X", to the given gateway 125 of the bank "X", located in the local network 122 of this bank, for the IP address replacement.

The first stage 400 of the present method hence advances to step 425.

Step 425: Receiving the Packet at the Gateway from the Central Server

At step 425, according to certain non-limiting embodiments of the present technology, the central server 101 can be configured to transmit the outgoing traffic packet, encapsulated at step 420, to the given gateway 125; and the given gateway 125 can be configured to receive it for further transmitting the outgoing traffic packet to the external server 130. To that end, according to certain non-limiting embodiments of the present technology, the given gateway can be configured to: (i) decapsulate the outgoing traffic packet; (ii) identify the destination IP address at the WireGuard layer of the packet; and (iii) identify the destination IP address at the GRE layer.

In the example provided at step 420, the given gateway 125, located in the local network 122 of bank "X, where the addresses mentioned are identified. can be configured to receive, along with the data containing both the payload (request to the external server 130), the sender and the recipient IP addresses at the WireGuard and GRE levels are received from the central server 101 of company "G".

The first stage 400 hence advances to step 430.

Step 430: Forwarding the Packet from the Gateway to the External Server

At step 430, in some non-limiting embodiments of the present technology in response to identifying the IP address of the external server 130 specified as the destination IP address at the GRE level of the outgoing traffic packet received, the given gateway 125 can be configured to forward, on behalf thereof, the outgoing traffic packet to the external server 130. In some non-limiting embodiments of the present technology, at the same time, the given gateway 125 can be configured to nat the outgoing traffic packet in such a way that the it has the following configuration:
the payload level;
the Internet connection level, where: the IP address of the given gateway 125 is specified as the source IP address, and the IP address of the external server 130 is specified as the destination IP address.

In some non-limiting embodiments of the present technology, the given gateway 125 may be located behind the second natting procedure 121 and not have its own public IP address. In these embodiments, in the outgoing traffic packet at the level of the Internet connection, the local IP address of the given gateway 125 is indicated as the destination IP address, and the natting is further performed by the given gateway 125 prior to transmitting the outgoing traffic packet to the external server 130.

In other non-limiting embodiments of the present technology, the given gateway 125 may have its own public IP address. In these embodiments, this public IP address is specified as the sender IP address at the level of the Internet connection, and the natting is not thus performed.

In other words, at step 425, the natting can be performed on the given gateway 125 installed in the network 122 of the bank "X". As a result of the natting on the given emitter 115, where the initial request was formed, the IP address of the given gateway 125 which occupies the address location of the network 122 of the bank "X" is specified instead of the IP-address of the company "G". Thus, the external server 130, upon receiving the outgoing traffic packet, will identify the IP address of the given gateway 125 as belonging to the attacked local network 122, and not that of the given emitter 115, and will perform the expected action, for example, sending an incoming traffic packet, which may include malicious content, such as a malicious file.

Figure 4B:
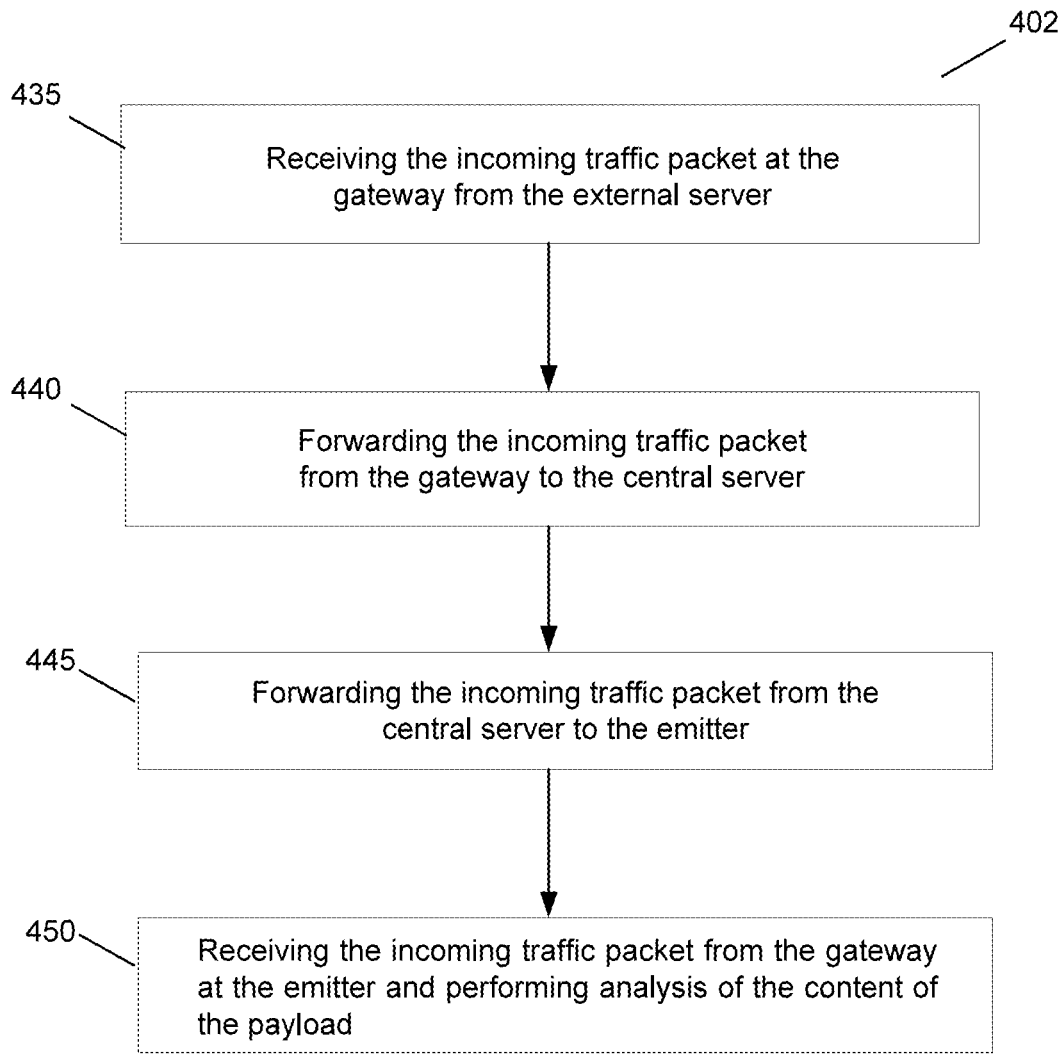
FIG. 4B depicts a flowchart diagram of a second stage of the present method, including transmitting incoming traffic from the external server to the distributed network, in accordance with certain non-limiting embodiments of the present technology.

The first phase 400 hence terminates, and the method proceeds to a second stage 402, a flowchart of which is depicted in FIG. 4B, in accordance with certain non-limiting embodiments of the present technology.

Step 435: Receiving the Incoming Traffic Packet at the Gateway from the External Server At step 435, according to certain non-limiting embodiments of the present technology, the given gateway 125 can be configured to receive the incoming traffic packet from the external server 130. According to certain non-limiting embodiments of the present technology, the incoming traffic packet can have following configuration:
the payload level;
the Internet connection level, where: the source IP address is the IP address of the external server 130, and the destination IP address is the IP address of the given gateway 125.

The second stage 402 of the method thus proceeds to step 440.

Step 440: Forwarding the Incoming Traffic Packet from the Gateway to the Central Server At step 440, according to certain non-limiting embodiments of the present technology, the given gateway 125 can be configured to forward the incoming traffic packet to the central server 101. In order to that, the given gateway 125 can be configured to submit a query to the neighbor table and receives the IP address of the given gateway 125 at the GRE level, that is, the IP address of the central server 101 at the GRE level. Next, the given gateway 125 can be configured to access the neighbor table to obtain the first IP address 210 of the central server 101 at the WireGuard level.

The second stage 402 of the method hence advances to step 445.

Step 445: Forwarding the Incoming Traffic Packet from the Central Server to the Emitter At step 445, according to certain non-limiting embodiments of the present technology, the central server 101 can be configured to transmit the incoming traffic packet to the given emitter 115. To do this, in some non-limiting embodiments of the present technology, the central server 101 can be configured to encapsulate the incoming traffic packet so as to have:

the payload level;

the GRE level, where: as the source IP address, the IP address of the external server 130 is specified; as the destination IP address, the IP address of the given emitter 115 is specified at the GRE level;

the WireGuard level, where: as the source IP address, the IP address of the given gateway 125 is specified at the WireGuard level; as the destination IP address, the IP address of the given emitter 115 is specified at the WireGuard level; and the Internet connection level, where: as the source IP address, the IP address of the central server 101 is specified; as the destination IP address, the public IP address of the given emitter 115 is specified.

In the above example, in steps 435-445, the given gateway 125 is configured to: receive, from the external server 130, the potentially malicious file; forward, via the central server 101, the potentially malicious file to the cybersecurity company "G" for analysis, where the potentially malicious file is further forwarded to the given emitter 115.

Thus, the second stage 402 of the method proceeds to step 450.

Step 450: Receiving the Incoming Traffic Packet from the Gateway at the Emitter and Performing Analysis of the Content of the Payload At step 450, according to certain non-limiting embodiments of the present technology, the given emitter 115 is configured to receive, from the central server 101, the incoming traffic packet; and analyze the content of the incoming traffic packet for maliciousness. For example, in some non-limiting embodiments of the present technology, to that end, the given emitter 115 can be configured to: (i) activate (that is launch, for example) a potentially malicious file contained in the payload of the incoming traffic packet; and identify and analyze actions performed by the potentially malicious file in the isolated environment.

Further, according to certain non-limiting embodiments of the present technology, the isolated environment can be configured to analyze the actions executed by the so activated potentially malicious file to determine whether it is malicious or harmless. Further, if the analysis showed that the file is safe, in some non-limiting embodiments of the present technology, the given emitter 115 can be configured to: (i) mark then the email including the link to this file as being safe; and (ii) deliver this email to the addressee, an employee of the bank "X", such as that associated with the given gateway 125.

The second stage 402 and the present method hence terminate.

In one embodiment, the central server 101 and the given emitter 115 may be implemented as a computing device, particularly as a server, mainframe, or as a cloud infrastructure, that is, a collection (cluster) of servers. Alternative implementations are also possible, where the central server 101 and emitter 115 can be implemented as any other computing device capable of performing the functions described above.

It will be obvious to the specialist that the given gateway 125 can be implemented as any computing device located in the client's local network and allowing the routing functions described above to be implemented, for example, as a personal computer, mainframe, server, server cluster, thin client, smartphone, laptop, tablet and so on.

Computing Environment

With reference to FIG. 5, there is depicted an example functional diagram of the computing environment 500 configurable to implement certain non-limiting embodiments of the present technology including the preparatory, first, and second stages 300, 400, and 402 of the present method described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the preparatory, first, and second stages 300, 400, and 402 of the present method described above.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS532, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 506 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of tunneling traffic in a distributed network for detecting malicious content, the distributed network being implemented using two-layer tunneling, including a WireGuard level and a GRE level; the method being executable by at least one central server of the distributed network, the method comprising:
   adding, by the at least one central server, at least one emitter and at least one gateway to a neighbor table hosted on the at least one central server:
      the at least one emitter being a peer of the distributed network configured for analyzing malicious content and receiving data packets encapsulated at the WireGuard level and at the GRE level; and
      the at least one gateway being a peer of the distributed network configured for natting at least one outgoing traffic packet and denatting at least one incoming traffic packet;
   transmitting, by the at least one central server, an IP address of a given emitter of the at least one emitter to a respective gateway of the at least one gateway, the given emitter corresponding to the respective gateway in the neighbor table;
   transmitting, by the at least one central server, an IP address of the respective gateway to the given emitter, the respective gateway corresponding to the given emitter in the neighbor table;
   in response to receiving at least one packet of outgoing traffic from the given emitter, decapsulating, by the at least one central server, the at least one packet of outgoing traffic;
   identifying, by the at least one central server, at the WireGuard level of the at least one packet of outgoing traffic, the IP address of the respective gateway associated with the given emitter;
   encapsulating, by the at least one central server, the at least one packet of outgoing traffic at the WireGuard level and the GRE level,
      at least one IP address specified at the WireGuard level being different from at least one IP address specified at the GRE level; and
   forwarding, by the at least one central server, the at least one packet of outgoing traffic to the respective gateway for natting for transmitting the at least one packet to an external server on behalf of the respective gateway.

2. The method of claim 1, wherein the at least one packet has been transmitted by the given emitter in response to receiving, from the external server, a link to potentially malicious content.

3. The method of claim 1, wherein the encapsulating comprises specifying, for the at least one packet:
   the IP address of the given emitter at both the WireGuard and GRE levels as being a sender of the at least one packet;
   the IP address of the respective gateway at the WireGuard level as being an intermediary recipient of the at least one packet; and
   an IP address of the external server at the GRE level as being a destination recipient of the at least one packet.

4. The method of claim 1, wherein the natting comprises specifying, for the at least one packet: (i) the IP address of the respective gateway as being the sender of the at least one packet; and (ii) the IP address of the external server as being the destination recipient of the at least one packet for transmitting the at least one packet to the external server.

5. The method of claim 1, wherein the IP address of either one of the given emitter and the respective gateway includes:
   an Internet IP address;
   an IP address at the WireGuard level; and
   an IP address at the GRE level.

6. The method of claim 1, wherein the adding the at least one emitter and the at least one gateway to the neighbor table comprises generating, by the at least one central server, a configuration file.

7. A method for routing traffic within a distributed network for detecting malicious content, the distributed network including at least one central server communicatively coupled to at least one emitter and at least one gateway, the method being executable by a given gateway of the at least one gateway, the method comprising:
   in response to receiving, by the given gateway, from the at least one emitter via the at least one central server, at least one outgoing traffic packet, decapsulating the at least one outgoing traffic packet;
   identifying, by the given gateway, in the at least one outgoing traffic packet, data of an external server for forwarding the at least one outgoing traffic packet thereto, the data having been specified at a GRE level of the at least one outgoing traffic packet;
   natting, by the given gateway, the at least one outgoing traffic packet, by specifying, for the at least one outgoing traffic packet, an IP address of the given gateway as being a sender of the at least one outgoing traffic packet;
   transmitting, by the given gateway, the at least one outgoing traffic packet to an external server; and
   in response to receiving, by the given gateway, at least one incoming traffic packet from the external server, denatting the at least one incoming traffic packet;
   encapsulating, by the given gateway, the at least one incoming traffic packet at a WireGuard level and the GRE level, at least one IP address specified at the WireGuard level being different from at least one IP address specified at the GRE level; and
   transmitting, by the given gateway, via the at least one central server, the at least one incoming traffic packet to the at least one emitter for analyzing content thereof for maliciousness.

8. The method of claim 7, wherein the at least one outgoing traffic packet has been transmitted by the at least one emitter in response to receiving, from the external server, a link to potentially maliciousness content.

9. The method of claim 7, prior to the receiving, further comprising receiving, by the given gateway, a configuration file from the at least one central server.

10. The method of claim 9, further comprising configuring, by the given gateway, interfaces at the WireGuard level and the GRE level using the configuration file received.

11. The method of claim 9, prior to the receiving, further comprising receiving an IP address of the at least one emitter received from the at least one central server.

12. The method of claim 7, wherein the encapsulating comprises specifying, for the at least one incoming traffic packet: (i) an IP address of the at least one central server at the GRE level; and (ii) an IP address of the at least one emitter at the WireGuard level.

13. A server of a distributed network for tunneling traffic therein for detecting malicious content, the distributed network being implemented using two-layer tunneling, including a WireGuard level and a GRE level; the server comprising a processor and non-transitory computer-readable medium storing instructions, and the processor, upon executing the instructions, being configured to:
- add at least one emitter and at least one gateway to a neighbor table hosted on the server:
  - the at least one emitter being a peer of the distributed network configured for analyzing malicious content and receiving data packets encapsulated at the WireGuard level and at the GRE level; and
  - the at least one gateway being a peer of the distributed network configured for natting at least one outgoing traffic packet and denatting at least one incoming traffic packet;
- transmit an IP address of a given emitter of the at least one emitter to a respective gateway of the at least one gateway, the given emitter corresponding to the respective gateway in the neighbor table;
- transmit an IP address of the respective gateway to the given emitter, the respective gateway corresponding to the given emitter in the neighbor table;
- in response to receiving at least one packet of outgoing traffic from the given emitter, decapsulate the at least one packet of outgoing traffic;
- identify at the WireGuard level of the at least one packet of outgoing traffic, the IP address of the respective gateway associated with the given emitter;
- encapsulate the at least one packet of outgoing traffic at the WireGuard level and the GRE level,
  - at least one IP address specified at the WireGuard level being different from at least one IP address specified at the GRE level; and
- forward the at least one packet of outgoing traffic to the respective gateway for natting for transmitting the at least one packet to an external server on behalf of the respective gateway.

14. The server of claim 13, wherein to encapsulate the at least one packet of outgoing traffic at the WireGuard level and the GRE level, the processor is configured to specify, for the at least one packet:
- the IP address of the given emitter at both the WireGuard and GRE levels as being a sender of the at least one packet;
- the IP address of the respective gateway at the WireGuard level as being an intermediary recipient of the at least one packet; and
- an IP address of the external server at the GRE level as being a destination recipient of the at least one packet.

15. The server of claim 13, wherein the natting comprises specifying, for the at least one packet: (i) the IP address of the respective gateway as being the sender of the at least one packet; and (ii) the IP address of the external server as being the destination recipient of the at least one packet for transmitting the at least one packet to the external server.

16. The server of claim 13, wherein the IP address of either one of the given emitter and the respective gateway includes:
- an Internet IP address;
- an IP address at the WireGuard level; and
- an IP address at the GRE level.

17. The server of claim 13, wherein to add the at least one emitter and the at least one gateway to the neighbor table, the processor is configured to generate a configuration file.

18. An electronic device of a distributed network for routing traffic therewithin for detecting malicious content, the electronic device being communicatively coupled, via the distributed network, to at least one central server and at least one emitter of the distributed network, the electronic device comprising a processor and non-transitory computer-readable medium storing instructions, and the processor, upon executing the instructions, being configured to:
- in response to receiving, from the at least one emitter via the at least one central server, at least one outgoing traffic packet, decapsulate the at least one outgoing traffic packet;
- identify, in the at least one outgoing traffic packet, data of an external server for forwarding the at least one outgoing traffic packet thereto, the data having been specified at a GRE level of the at least one outgoing traffic packet;
- nat the at least one outgoing traffic packet by specifying, for the at least one outgoing traffic packet, an IP address of the given gateway as being a sender of the at least one outgoing traffic packet;
- transmit the at least one outgoing traffic packet to an external server; and
- in response to receiving at least one incoming traffic packet from the external server, denat the at least one incoming traffic packet;
- encapsulate the at least one incoming traffic packet at a WireGuard level and the GRE level, at least one IP address specified at the WireGuard level being different from at least one IP address specified at the GRE level; and
- transmit, via the at least one central server, the at least one incoming traffic packet to the at least one emitter for analyzing content thereof for maliciousness.

19. The electronic device of claim 18, wherein, prior to receiving the at least one outgoing traffic packet, the processor is further configured to receive a configuration file from the at least one central server.

20. The electronic device of claim 19, wherein the processor is further configured to configure interfaces at the WireGuard level and the GRE level using the configuration file received.

21. The electronic device of claim 19, wherein, prior to receiving the at least one outgoing traffic packet, the processor is further configured to receive an IP address of the at least one emitter received from the at least one central server.

22. The electronic device of claim 18, wherein to encapsulate the at least one incoming traffic packet, the processor is configured to specify, for the at least one incoming traffic packet: (i) an IP address of the at least one central server at the GRE level; and (ii) an IP address of the at least one emitter at the WireGuard level.

\* \* \* \* \*